UNITED STATES PATENT OFFICE.

GEORGE HEATH, OF SENECA FALLS, NEW YORK, ASSIGNOR OF ONE-HALF HIS RIGHT TO ALBERT PROUDFOOT, OF SAME PLACE.

IMPROVEMENT IN PROCESSES FOR COATING THE INTERIOR OF CASKS.

Specification forming part of Letters Patent No. 164,298, dated June 8, 1875; application filed April 8, 1875.

*To all whom it may concern:*

Be it known that I, GEORGE HEATH, now residing at Seneca Falls, county of Seneca and State of New York, have invented an Improved Process of Waterproofing or Enameling the Interior of Casks, of which the following is a specification :

My invention consists in the process hereinafter shown and described of coating or applying to the interior of casks a composition formed of alcohol, gum-shellac, pulverized charcoal, and bees-wax, in the proportions hereinafter particularly specified, whereby the cask is rendered and kept sweet, and leakage and evaporation of any liquid contents of the cask are prevented.

In carrying out my process, I employ a composition of the following ingredients, in the proportions named, to wit: One gallon of alcohol, one and three-quarter pound of gum-shellac, one-quarter pound of pulverized charcoal, and one ounce of bees-wax; and, after placing them together in a suitable vessel, I apply heat to them until the mass is thoroughly dissolved and well mixed.

As the first step in my process, I invert the cask, the head having been removed, over a hot fire. I have found a charcoal fire to answer this purpose the best. When the interior surface of the cask has become as hot as is possible without scorching the wood, I lay the cask on its side and apply a coating of the hot composition to the heated interior surface with a brush. This coating will enter into the pores of the wood, and the cracks and crevices in the cask, filling them full. When this coating has been absorbed by the wood, and while the surface is still heated, I apply another coating of the composition in the same way, and then set fire to the alcohol contained in this last coating by touching a match to it. The cask should then be kept rolling steadily until the alcohol has ceased to burn, and the composition is set. The head should then be similarly treated, and the cask headed up while it is yet warm, and allowed to stand and cool.

The ordinary mode of cleansing casks is by scalding, steaming, and soaking them with lime; but casks having their interior surfaces coated by my process, as described, require to be rinsed out with cold water only to cleanse them.

By means of my process, as described, I form an enamel upon the interior surface of the cask, filling up all the pores and crevices in the wood, and thus preventing the contact of the liquid contents of the cask with the surface of the wood.

I do not claim the composition I have described, and which I employ in my process, as new, or as my invention, intending to claim only the specific process herein shown and described, whereby I form an enamel coating on the interior surfaces of a cask.

What I claim as my invention, and desire to secure by Letters Patent, is—

The process of coating the interior surface of casks with the composition herein described, applied while hot to the heated cask, and then ignited, and the volatile portions burned away, substantially as described, and for the purpose specified.

GEORGE HEATH.

Witnesses:
JASPER N. HAMMOND,
NAT. L. BENHAM.